United States Patent
Chang

(10) Patent No.: US 12,360,445 B2
(45) Date of Patent: Jul. 15, 2025

(54) FOCUSING MODULE AND PROJECTION APPARATUS

(71) Applicant: Coretronic Corporation, Hsin-Chu (TW)

(72) Inventor: Chih-Hui Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 457 days.

(21) Appl. No.: 17/986,897

(22) Filed: Nov. 15, 2022

(65) Prior Publication Data

US 2023/0152676 A1    May 18, 2023

(30) Foreign Application Priority Data

Nov. 18, 2021   (CN) .................. 202111365815.6

(51) Int. Cl.
  *G03B 21/14*   (2006.01)
  *G03B 21/53*   (2006.01)
(52) U.S. Cl.
  CPC ......... *G03B 21/142* (2013.01); *G03B 21/145* (2013.01); *G03B 21/53* (2013.01)
(58) Field of Classification Search
  CPC ..... G03B 21/142; G03B 21/145; G03B 21/53
  USPC ........................................................ 353/101
  See application file for complete search history.

(56) References Cited

FOREIGN PATENT DOCUMENTS

| CN | 100392557 C | 6/2008 |
|---|---|---|
| CN | 104486982 A | 4/2015 |
| CN | 210319864 U | 4/2020 |
| JP | 2008083557 A * | 4/2008 |

OTHER PUBLICATIONS

Translation of JP 2008083557 (Year: 2015).*

* cited by examiner

*Primary Examiner* — Jerry L Brooks

(57) ABSTRACT

A focusing module includes a focusing ring and a projection lens mounting ring. The focusing ring has a first ring body and a first annular wall with a limiting hole. The projection lens mounting ring has a second annular wall which can rotate relative to the first annular wall along a circumferential direction of the first annular wall. The second annular wall has a through hole and a rotation buffer structure having a limiting portion and a cantilever portion. The limiting portion has a center surrounded by the hole edge and protruding toward the first annular wall. The center has first side and second side. A thickness of the limiting portion decreases from the center toward the first and second side. The center is in the limiting hole and the first annular wall is pressed against the first and second side when the limiting portion contacts against the limiting hole.

20 Claims, 6 Drawing Sheets

FOCUSING MODULE AND PROJECTION APPARATUS

CROSS-REFERENCE TO RELATED APPLICATION

This application claims the priority benefit of China application (202111365815.6), filed on Nov. 18, 2021. The entirety of the above-mentioned patent application is hereby incorporated by reference herein and made a part of this specification.

FIELD OF THE INVENTION

The invention relates to a focusing module, and more particularly to a focusing module adapted for a projection apparatus, and a projection apparatus including the focusing module.

BACKGROUND OF THE INVENTION

A conventional projection lens assembly for a projector typically includes a focusing ring and a projection lens. In general, the focusing ring is fixed on the projection lens and allows the user to conveniently rotate the focusing ring so that the projection lens is driven with the focusing ring to focus the projection lens. Further, the focusing ring is usually designed to be fixed on the projection lens with a locking structure. When the rotation of the projection lens reaches a threshold, the focusing ring will be locked on the projection lens, so that the focus ring and the projection lens cannot continue to rotate in the same direction.

However, many users often fail to notice that the rotation of the lens has reached a threshold and continue to forcefully rotate the focusing ring, which results in damage to the locking structure.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a focusing module adapted for a projection lens, so as to prevent the structure of the focusing module and the projection lens from being damaged due to excessive rotation of the focusing ring.

The invention provides a projection device with the advantage of good durability.

Other advantages and objects of the invention may be further illustrated by the technical features broadly embodied and described as follows.

In order to achieve one or part or all of the above-mentioned purposes or other purposes, the focusing module provided by the invention is adapted for a projection lens with an optical axis. The focusing module includes a focusing ring and a projection lens mounting ring. The focusing ring has a first ring body and a first annular wall. The first ring body has a first opening and a second opening opposite to each other. The first annular wall is connected to the first ring body and surrounds the first opening. The first annular wall has a limiting hole, an inner annular surface and an outer annular surface. The inner annular surface is opposite to the outer annular surface. The limiting hole penetrates the inner annular surface and the outer annular surface of the first annular wall along a direction perpendicular to the optical axis. The projection lens mounting ring has a second annular wall adapted to be fixed to the projection lens along the optical axis. The second annular wall is disposed on an inner side of the first annular wall and is adapted to rotate relative to the first annular wall along a circumferential direction of the first annular wall. The second annular wall has a through hole and a rotation buffer structure. The rotation buffer structure is located in the through hole and has a limiting portion and a cantilever portion. The cantilever portion is connected between the limiting portion and a hole edge of the through hole. The limiting portion has a center surrounded by the hole edge. The center protrudes toward a direction facing the first annular wall of the focusing ring and has a first side and a second side opposite to each other in the circumferential direction. A thickness of the limiting portion gradually decreases from the center toward the first side and the second side in a radial direction of the second annular wall. The center of the limiting portion is located in the limiting hole and the first annular wall is pressed against the first side and the second side when the limiting portion of the rotation buffer structure contacts against the limiting hole of the focusing ring.

In an embodiment of the invention, the first side and the second side of the center of the limiting portion each have a guiding slope.

In an embodiment of the invention, the guiding slopes are connected to each other and surround the center of the limiting portion.

In an embodiment of the invention, the first annular wall of the focusing ring surrounds an outer side of the second annular wall with the optical axis as a center, and the inner annular surface of the first annular wall faces the second annular wall. When the focusing ring rotates around the optical axis, the limiting hole of the focusing ring presses against the limiting portion of the rotation buffer structure, so that the projection lens mounting ring and the focusing ring rotate synchronously.

In an embodiment of the invention, when the cantilever portion of the rotation buffer structure of the projection lens mounting ring is elastically deformed in a direction away from the inner annular surface and the center of the limiting portion leaves the limiting hole, the center of the limiting portion is pressed against the inner annular surface of the first annular wall of the focusing ring, so that the focusing ring rotates relative to the projection lens mounting ring.

In an embodiment of the invention, the inner annular surface of the first annular wall of the focusing ring has a plurality of stage difference structures. The stage difference structures are spaced apart from each other and arranged along the circumferential direction. The stage difference structures correspond to the center of the limiting portion.

In an embodiment of the invention, a number of the limiting holes is plural, and a number of the through holes corresponds to the number of the limiting holes. The limiting holes and the through holes are arranged equidistantly in the circumferential direction.

In an embodiment of the invention, the second annular wall of the projection lens mounting ring is adapted to be locked to the projection lens along the direction perpendicular to the optical axis via a plurality of locking members. Each of the locking members has a shaft portion and a head portion. The second annular wall further has an inner side surface, an outer side surface, an annular top edge and a plurality of installation openings. The annular top edge is connected between the inner side surface and the outer side surface. Each of the installation openings penetrates the inner side surface and the outer side surface along the direction perpendicular to the optical axis and extends to the annular top edge along a direction parallel to the optical axis. Each of the installation openings is provided with two hook portions opposite to each other. A clamping area and a channel area are formed between the two hook portions. The channel area is communicated with the clamping area along the direction parallel to the optical axis and extends to the annular top edge. When the projection lens mounting ring is assembled to the projection lens along the optical axis, the two hook portions in each of the installation openings are adapted to deform so that the shaft portion passes through the channel area and is fixed in the clamping area.

In an embodiment of the invention, the projection lens mounting ring further has a third opening and a fourth opening. The third opening and the fourth opening are respectively located on opposite sides of the second annular wall and the second annular wall surrounds the third opening and the fourth opening. The fourth opening is adapted for the projection lens to be installed. The second annular wall has a third side close to the third opening and a fourth side close to the fourth opening. An outer diameter of the second annular wall on the fourth side is smaller than an inner diameter of the first opening, and an outer diameter of the second annular wall on the third side is bigger than the inner diameter of the first opening.

In an embodiment of the invention, two opposite ends of the cantilever portion of the rotation buffer structure are respectively connected to the limiting portion and the hole edge of the through hole, and the cantilever portion and the limiting portion are arranged along a direction parallel to the optical axis.

In order to achieve one or part or all of the above-mentioned purposes or other purposes, the projection apparatus provided by the invention includes a housing, an illumination system, a light valve, and a projection lens assembly. The illumination system is disposed in the housing and adapted to provide an illumination beam. The light valve is disposed in the housing and located on a transmission path of the illumination beam from the illumination system to convert the illumination beam into an image beam. The housing has an opening. The projection lens assembly is disposed in the opening and located on a transmission path of the image beam from the light valve to project the image beam out of the projection apparatus. The projection lens assembly includes a projection lens and a focusing module. The lens has an optical axis. The focusing module is connected to the projection lens.

In the focusing module of the invention, the focusing ring has the limiting hole, the projection lens mounting ring has the rotation buffer structure corresponding to the limiting hole, and the limiting portion of the rotation buffer structure can be located in the limiting hole. Further, the thickness of the limiting portion gradually decreases from the center toward the opposite first side and second side, and the first annular wall can press against the first side and the second side. Therefore, when the rotational force on the focusing ring is too large, the first annular wall will gradually move toward the center from the second side (or the first side) and then press against the center to disengage the center from the limiting hole. In this case, because the center of the limiting portion is pressed against by the first annular wall, the second annular wall will move along the first annular wall when the focusing ring is continuously rotated. In this way, the focusing ring can rotate relative to the projection lens mounting ring instead of driving the projection lens mounting ring to rotate together, thereby preventing the structures of the focusing module and the projection lens from being damaged due to excessive rotation of the focusing ring. On the other hand, the projection apparatus of the invention has the advantage of good durability due to adopting the aforementioned focusing module.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
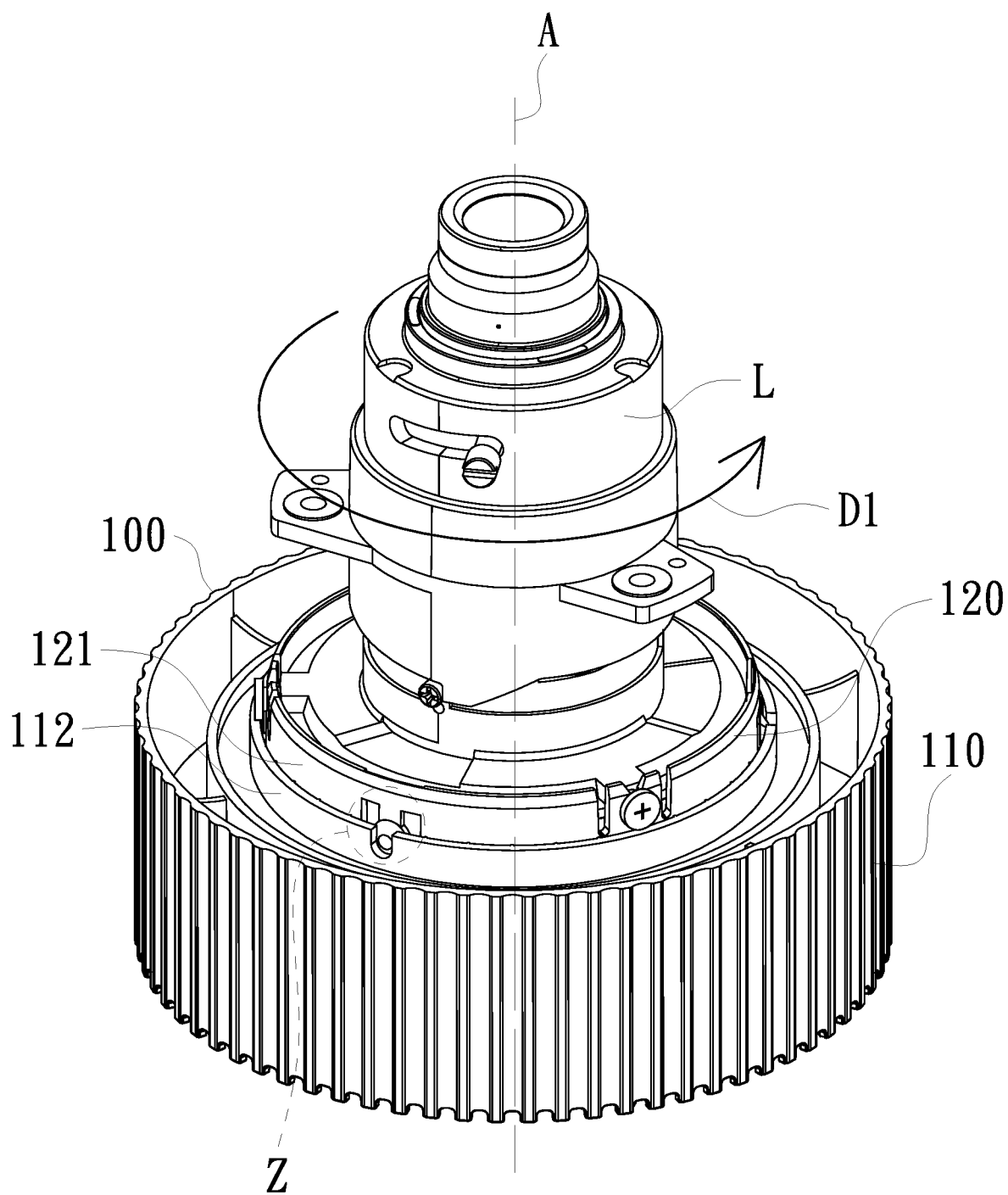
FIG. 1 is a schematic view of an assembly of a focusing module and a projection lens according to an embodiment of the invention.

FIG. 1 is a schematic view of an assembly of a focusing module and a projection lens according to an embodiment of the invention. Please refer to FIG. 1. The focusing module 100 is suitable for the projection lens L and includes a focusing ring 110 and a projection lens mounting ring 120. The projection lens mounting ring 120 is adapted to be fixed on the projection lens L, and the focusing ring 110 is connected to the projection lens mounting ring 120. The projection lens L is, for example, a projection lens and has an optical axis A. The focusing module 100 can be used to adjust the focal length of the projection lens. Features of the focusing ring 110 and the projection lens mounting ring 120 will be described below.

Figure 2:
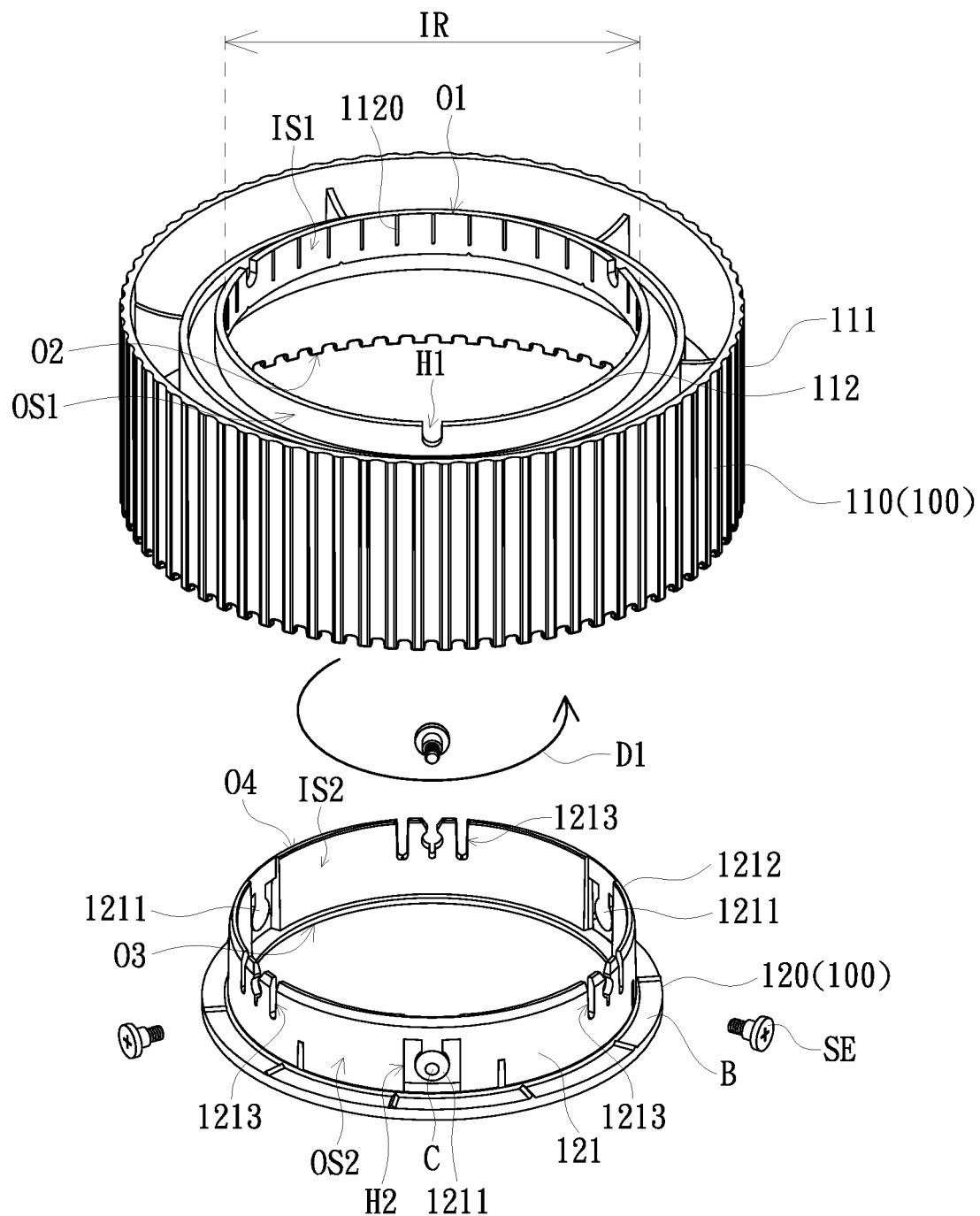
FIG. 2 is a schematic exploded view of the focusing module and the locking member in FIG. 1.
Figure 3:
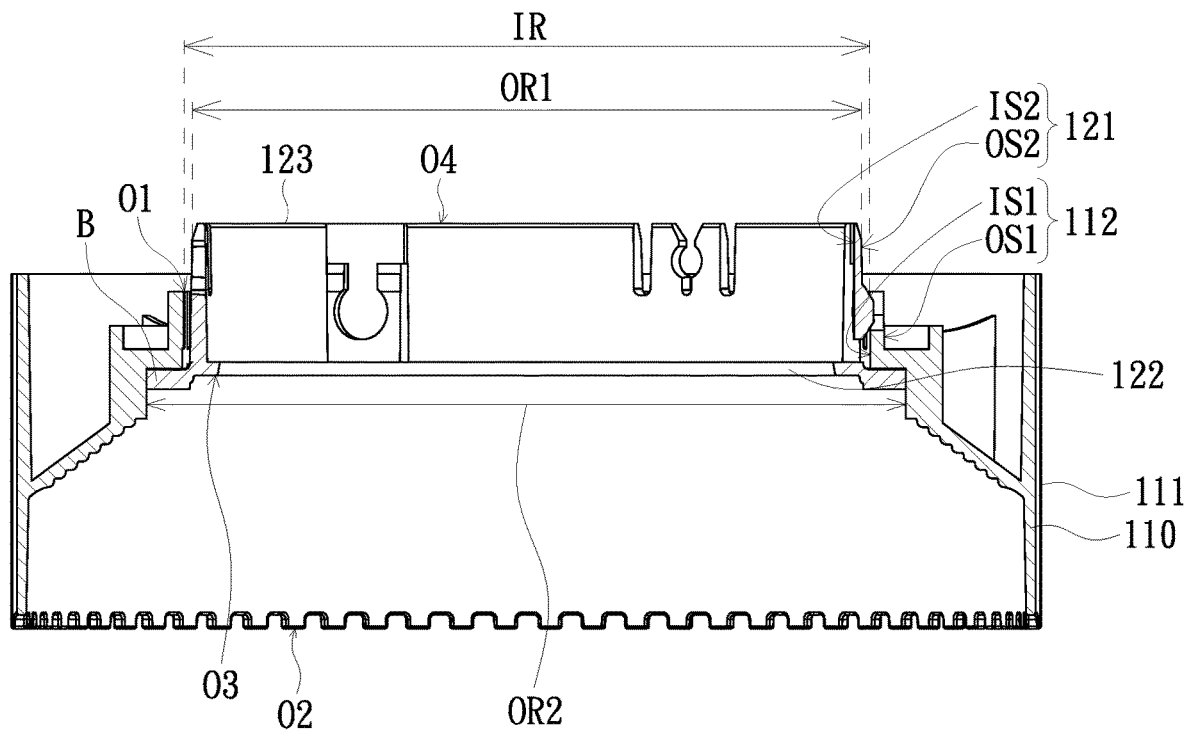
FIG. 3 is a schematic cross-sectional view of the focusing module in FIG. 1.

FIG. 2 is a schematic exploded view of the focusing module and the locking member in FIG. 1. FIG. 3 is a schematic cross-sectional view of the focusing module in FIG. 1. Please refer to FIGS. 1, 2 and 3 together. The focusing ring 110 has a first ring body 111 and a first annular wall 112. The first ring body 111 and the first annular wall 112 are, for example, annular members. The first ring body 111 has a first opening O1 and a second opening O2 opposite to each other, and the first opening O1 and the second opening O2 communicate with each other. The first annular wall 112 is connected to the first ring body 111 and surrounds the first opening O1. The first annular wall 112 has a limiting hole H1 (shown in FIG. 2), an inner annular surface IS1 and an outer annular surface OS1. The inner annular surface IS1 is opposite to the outer annular surface OS1. The limiting hole H1 penetrates the inner annular surface IS1 and the outer annular surface OS1 of the first annular wall 112 along a direction perpendicular to the optical axis A of the projection lens L. Incidentally, the limiting hole H1 of this embodiment extends, for example, to the top edge of the first annular wall 112, but other embodiments are not limited thereto.

Please continue to refer to FIGS. 1 and 2. In this embodiment, the projection lens mounting ring 120 has a second annular wall 121, and the second annular wall 121 is adapted to be fixed to the projection lens L along the optical axis A. The second annular wall 121 is disposed on the inner side of the first annular wall 112, and the second annular wall 121 is adapted to rotate relative to the first annular wall 112 along the circumferential direction D1 of the first annular wall 112. The second annular wall 121 has a through hole H2 and a rotation buffer structure 1211. The through hole H2 penetrates, for example, the second annular wall 121 along the direction perpendicular to the optical axis A of the projection lens L. When the projection lens mounting ring 120 and the focusing ring 110 are sleeved on the projection lens L along the optical axis A, the second annular wall 121 of the projection lens mounting ring 120 is disposed on the inner side of the first annular wall 112 of the focusing ring 110, that is, the second annular wall 121 of the projection lens mounting ring 120 and the first annular wall 112 of the focusing ring 110 are both disposed around the optical axis A.

Figure 4:
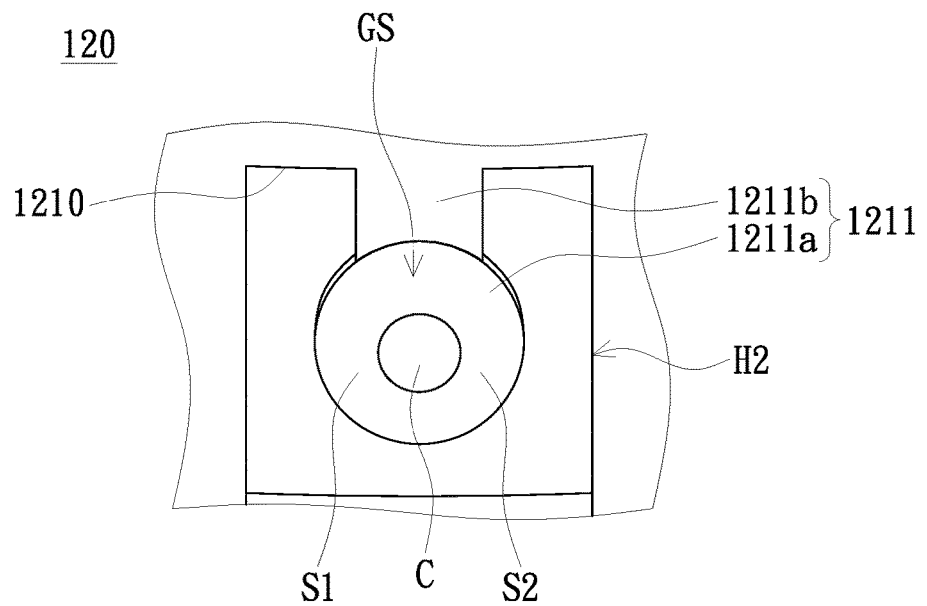
FIG. 4 is a schematic enlarged view of the rotation buffer structure in FIG. 2.
Figure 5:
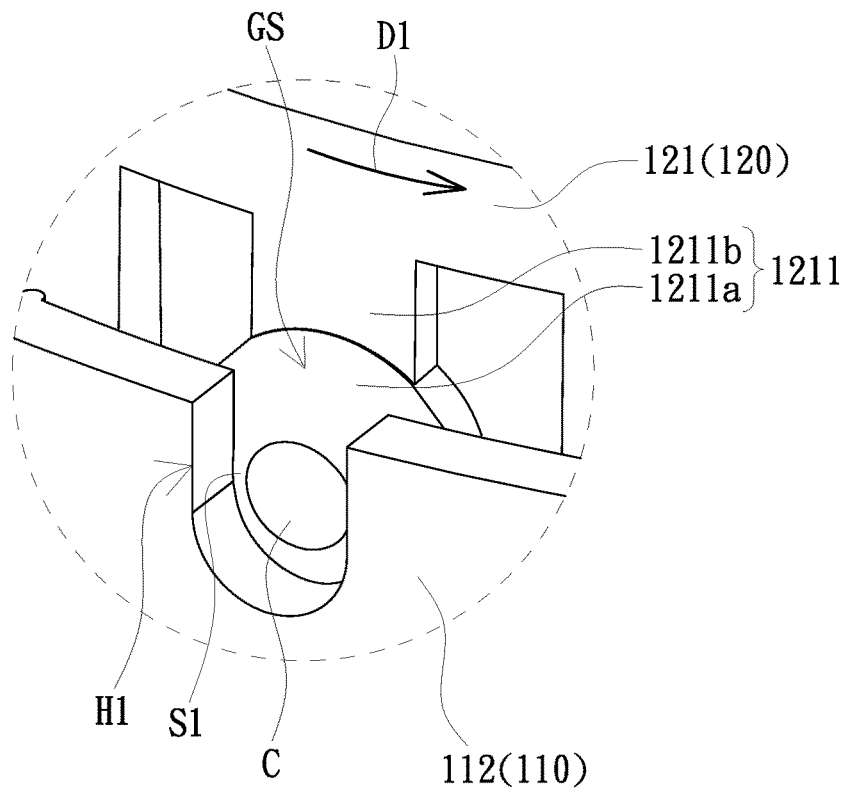
FIG. 5 is a schematic enlarged view of the area Z in FIG. 1.

FIG. 4 is a schematic enlarged view of the rotation buffer structure in FIG. 2. FIG. 5 is a schematic enlarged view of the area Z in FIG. 1. Please refer to FIGS. 1, 2, 4 and 5 together. The rotation buffer structure 1211 of the projection lens mounting ring 120 is located in the through hole H2 and has a limiting portion 1211a and a cantilever portion 1211b. The cantilever portion 1211b is connected between the limiting portion 1211a and the hole edge 1210 of the through hole H2. The limiting portion 1211a has a center C surrounded by the hole edge 1210. In detail, one end of the cantilever portion 1211b is connected to the hole edge 1210 of the through hole H2, and the other end thereof is connected to the limiting portion 1211a along the direction parallel to the optical axis A (shown in FIG. 1), for example. That is, the cantilever portion 1211b and the limiting portion 1211a are arranged, for example, along the direction parallel to the optical axis A, but the invention is not limited thereto. In this embodiment, when the projection lens mounting ring 120 and the focusing ring 110 are sleeved on the projection lens L along the optical axis A, the center C of the limiting portion 1211a protrudes toward the direction facing the first annular wall 112 (shown in FIG. 5), and has a first side S1 and a second side S2 opposite to each other in the circumferential direction D1 (labeled in FIGS. 1 and 2). In addition, please also refer to FIG. 6. In the radial direction D2 of the second annular wall 121, the center C is located between the first side S1 and the second side S2, and the thickness T of the limiting portion 1211a may gradually decrease from the center C toward the first side S1 and toward the second side S2.

Figure 6:
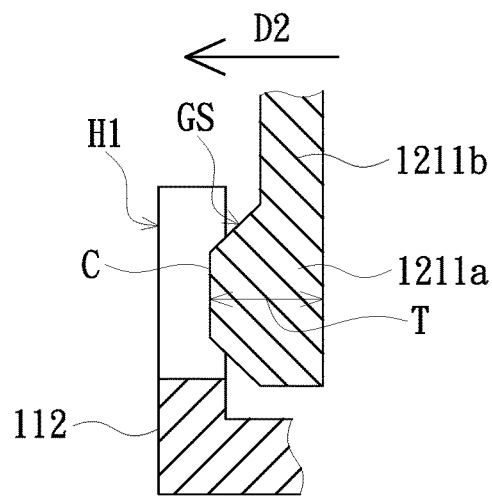
FIG. 6 is a schematic cross-sectional view of the center in FIG. 5 located in the limiting hole.
Figure 7:
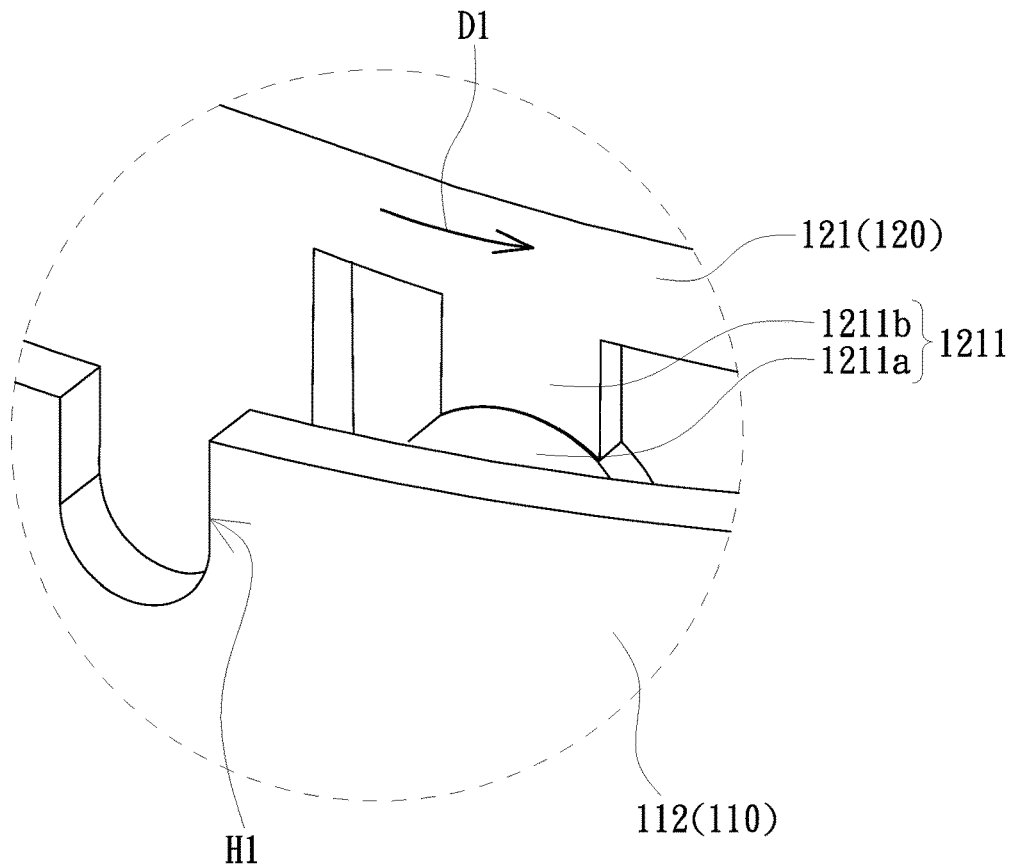
FIG. 7 is a schematic view of the first annular wall in FIG. 5 being pressed against the center.

Please continue to refer to FIGS. 5 and 6. When the limiting portion 1211a of the rotation buffer structure 1211 contacts against the limiting hole H1 of the first annular wall 112 of the focusing ring 110, the center C of the limiting portion 1211a protruding toward the first annular wall 112 is aligned in the limiting hole H1 and the first annular wall 112 (i.e., the hole edge of the limiting hole H1) presses against the first side S1 and the second side S2 (labeled in FIG. 4) of the limiting portion 1211a. Therefore, when the focusing ring 110 rotates relative to the projection lens mounting ring 120 along the circumferential direction D1 (labeled in FIG. 5) and the rotational force that the focusing ring 110 bears is bigger than a threshold, the position where the first annular wall 112 presses against the projection lens mounting ring 120 can be moved from the second side S2 of the limiting portion 1211a to the center C of the limiting portion 1211a, so that the center C of the limiting portion 1211a is disengaged from the limiting hole H1 of the first annular wall 112, as shown in FIGS. 5 and 7. In this way, the first annular wall 112 can continue to rotate relative to the second annular wall 121 of the projection lens mounting ring 120 along the circumferential direction D1 (labeled in FIG. 5) to prevent the focusing module 100 and the projection lens L (shown in FIG. 1) from being damaged by over-turning the focusing ring 110. Further, please refer to FIGS. 4, 5 and 6 together. The first side S1 and the second side S2 of the center C of the limiting portion 1211a may each have a guiding slope GS. Thus, the position where the first annular wall 112 presses against the projection lens mounting ring 120 can be moved from the second side S2 (or the first side S1) to the center C along the guiding slope GS, so that the focusing ring 110 can be easily rotated relative to the projection lens mounting ring 120. Please continue to refer to FIG. 4. The guiding slope GS in this embodiment can be arranged to surround the center C, but the invention is not limited thereto. For example, the guiding slope GS can only be arranged on the first side S1 or the second side S2 in an embodiment.

Figure 8:
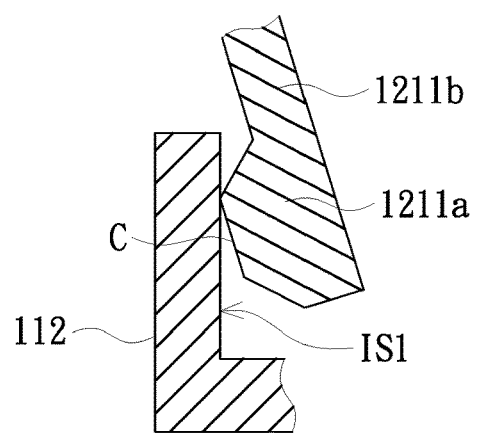
FIG. 8 is a schematic cross-sectional view of the first annular wall in FIG. 7 being pressed against the center.

FIG. 8 is a schematic cross-sectional view of the first annular wall in FIG. 7 being pressed against the center. Please refer to FIGS. 7 and 8 together. In this embodiment, the cantilever portion 1211b of the rotation buffer structure 1211 of the projection lens mounting ring 120 is elastically deformed when the center C is disengaged from the limiting hole H1 of the first annular wall 112 and pressed by the first annular wall 112. Further, the cantilever portion 1211b is elastically deformed in the direction away from the inner annular surface IS1 (shown in FIG. 8), that is, elastically deformed in the direction toward the optical axis A. When the cantilevered portion 1211b is elastically deformed in the direction away from the inner annular surface IS1 and the center C of the limiting portion 1211a leaves the limiting hole H1, the center C presses against the inner annular surface IS1 of the first annular wall 112 of the focusing ring 110, so that the focusing ring 110 rotates relative to the projection lens mounting ring 120. Incidentally, the cantilever portion 1211b in this embodiment is, for example, integrally formed with the limiting portion 1211a. However, in another embodiment, the cantilever portion 1211b may include a spring structure with an elastic deformation function.

Please refer to FIGS. 1 and 5 again. On the other hand, when the rotational force that the focusing ring 110 bears is less than or equal to the threshold in this embodiment, the first annular wall 112 of the focusing ring 110 is pressed against the first side S1 and the second side S2 (shown in FIG. 4) of the limiting portion 1211a and at least part of the center C is clamped in the limiting hole H1 of the first annular wall 112, so that the focusing ring 110 can drive the projection lens mounting ring 120 to rotate synchronously. Specifically, the first annular wall 112 of the focusing ring 110 can surround the outer side of the second annular wall 121 with the optical axis A as the center, and the inner annular surface IS1 (shown in FIGS. 2 and 3) of the first annular wall 112 may face the second annular wall 121. When the focusing ring 110 rotates around the optical axis A, the hole edge of the limiting hole H1 of the focusing ring 110 can press against the limiting portion 1211a of the rotation buffer structure 1211 and then push against the projection lens mounting ring 120, so that the projection lens mounting ring 120 rotates synchronously with the focusing ring 110. Further, the hole edge of the limiting hole H1 and the part of the inner ring surface IS1 close to the hole edge can press against the first side S1 and the second side S2, so that the focusing ring 110 can drive the projection lens mounting ring 120 to rotate synchronously when the rotational force is less than or equal to the threshold.

Refer to FIG. 2 again. In order to facilitate the user to determine the rotation state of the focusing ring 110 and the projection lens mounting ring 120, the inner ring surface IS1 of the first annular wall 112 of the focusing ring 110 may have a plurality of stage difference structures 1120. The stage difference structures 1120 are spaced apart from each other, and each stage difference structure 1120 is arranged along the circumferential direction D1. The stage difference structures 1120 corresponds to the center C of the rotation buffer structure 1211. In this way, when the focusing ring 110 rotates relative to the projection lens mounting ring 120, the center C of the limiting portion 1211a will press against the stage difference structures 1120 in sequence while moving along the inner annular surface IS1. Thus, a feeling of segmented rotation is provided and a sound of the center C passing through the stage difference structures 1120 is generated, and therefore the user can know the current rotation state. It can be understood that the detailed features of the stage difference structure 1120 may vary according to the structure of the center C. For example, the center C of this embodiment may include a plane, and the shape of each stage difference structure 1120 is, for example, protruding from the inner ring surface IS1, that is, protruding toward the direction of the optical axis A. In other embodiments, the shape of the stage difference structure 1120 may be recessed on the inner annular surface IS1, and the invention is not limited thereto.

Incidentally, the number of the limiting holes H1 in this embodiment may be plural, and three limiting holes H1 are exemplarily shown in the figure. The number of the through holes H2 corresponds to the number of the limiting holes H1, and the limiting holes H1 and the through holes H2 are arranged equidistantly in the circumferential direction D1. In this way, the focusing ring 110 can be easily rotated to a position where the limiting hole H1 and the limiting portion 1211a are aligned with each other, thereby improving the convenience of operation. The specific number of the limiting holes H1 can be determined according to the overall structural strength of the focusing ring 110, and the invention does not limit the number of the limiting holes H1.

Please refer to FIGS. 2 and 3 together to illustrate the assembling method and corresponding features of the focusing ring 110 and the projection lens mounting ring 120. The projection lens mounting ring 120 further has a third opening O3 and a fourth opening O4. The third opening O3 and the fourth opening O4 are located on opposite sides of the second annular wall 121, respectively. The third opening O3 and the fourth opening O4 are communicated with each other, and the second annular wall 121 surrounds the third opening O3 and the fourth opening O4. The projection lens L is adapted to be disposed from the fourth opening O4 of the projection lens mounting ring 120. As shown in FIG. 3, the second annular wall 121 has a third side 122 close to the third opening O3 and a fourth side 123 close to the fourth opening O4. The outer diameter OR1 of the second annular wall 121 of the projection lens mounting ring 120 on the fourth side 123 is smaller than the inner diameter IR of the first opening O1 of the first ring body 111 of the focusing ring 110, and the outer diameter OR2 of the second annular wall 121 of the projection lens mounting ring 120 on the third side 122 is bigger than the inner diameter IR of the first opening O1 of the first ring body 111 of the focusing ring 110. Therefore, when assembling the focusing ring 110 and the projection lens mounting ring 120, the fourth side 123 of the projection lens mounting ring 120 can be inserted into the focusing ring 110 from the second opening O2 of the focusing ring 110 in the direction toward the first opening O1 and is fixed in the first opening O1, and the third side 122 of the projection lens mounting ring 120 can be fixed in the second opening O2 of the focusing ring 110. In this embodiment, the third side 122 has, for example, an annular base B. The annular base B extends outward along the outer edge of the third side 122 in the direction perpendicular to the optical axis A, so as to increase the outer diameter OR2 and therefore block the annular base B of the third sides 122 in the focusing ring 110, but the specific structure of the third side 122 is not limited thereto.

Figure 9:
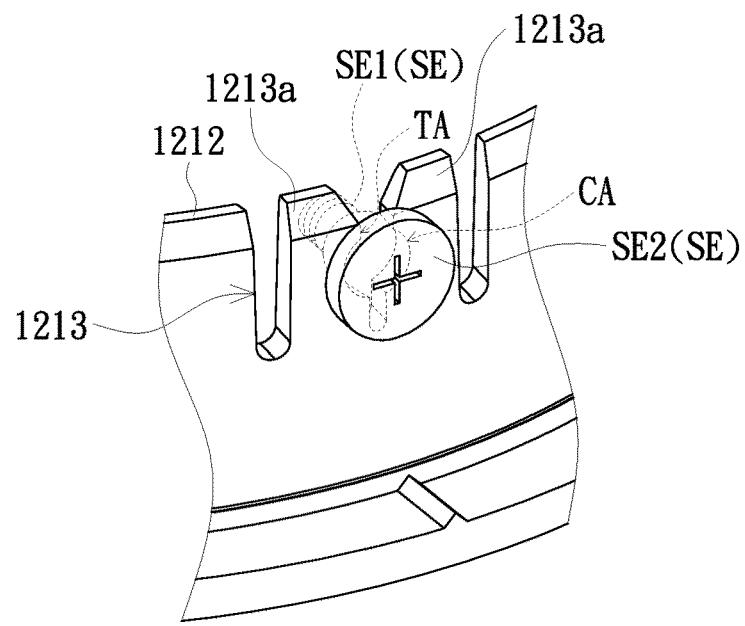
FIG. 9 is a schematic view of the locking member being fixed in the installation opening.

Please refer to FIGS. 1, 2, 3 and 9 together to illustrate the assembling method and corresponding features of the projection lens mounting ring 120 and the projection lens L. The second annular wall 121 of the projection lens mounting ring 120 is adapted to be locked to the projection lens L along the direction perpendicular to the optical axis A via a plurality of locking members SE. Each locking member SE has a shaft portion SE1 and a head portion SE2 connected to each other. The second annular wall 121 further has an inner side surface IS2 (also shown in FIG. 3), an outer side surface OS2 (also shown in FIG. 3), an annular top edge 1212 and a plurality of installation openings 1213. The annular top edge 1212 is connected between the inner side surface IS2 and the outer side surface OS2 and is located on the fourth side 123 of the second annular wall 121. The installation openings 1213 are, for example, spaced along the circumferential direction, and each installation opening 1213 penetrates the inner side surface IS2 and the outer side surface OS2 of the second annular wall 121 along the direction perpendicular to the optical axis A and extends to the annular top edge 1212 along the direction parallel to the optical axis A. As shown in FIG. 9, each installation opening 1213 is provided with two hook portions 1213a opposite to each other. A clamping area CA and a channel area TA are formed between the two hook portions 1213a. The channel area TA communicates with the clamping area CA along the direction parallel to the optical axis A and extends to the annular top edge 1212. Please refer to FIGS. 1 and 9 together. The locking members SE are locked to the outer side of the lens barrel (not labeled) of the projection lens L along the direction perpendicular to the optical axis A, so that a part of the shaft portion SE1 of the locking member SE is locked to the projection lens L, and another part of the shaft portion SE1 and the head portion SE2 are exposed to the projection lens L. When the projection lens mounting ring 120 is assembled to the projection lens L along the optical axis A, the two hook portions 1213a located in each installation opening 1213 of the second annular wall 121 are adapted for deformation, so that the shaft portion SE1 exposed to the projection lens L passes through the channel area TA and is fixed in the clamping area CA. Specifically, the shaft portion SE1 is, for example, in transition fit with the channel area TA and the clamping area CA, and the head portion SE2 can be in an interference fit with the clamping area CA. Please refer to FIGS. 1, 2 and 9 together again. When assembling the projection lens mounting ring 120 and the projection lens L, the locking member SE is locked on the projection lens L, the channel area TA on the second annular wall 121 is aligned with the shaft portion SE1, and then the projection lens L is inserted into the projection lens mounting ring 120 through the third opening O3 (shown in FIG. 2). In this way, the shaft portion SE1 of the locking member SE can extend from the channel area TA between the two hook portions 1213a along the optical axis A and be fixed in the clamping area CA, so that the two hook portions 1213a are pressed by the shaft portion SE1 and deformed. The two hook portions 1213a are restored when the shaft portion SE1 moves into the clamping area CA, and the restored hook portions 1213a and the head portion SE2 can prevent the locking member SE from falling off from the clamping area CA. Thus, the projection lens mounting ring 120 of this embodiment can be quickly assembled on the projection lens L and can be axially limited through the hook portions 1213a. When the focusing ring 110 rotates around the optical axis A, the hole edge of the limiting hole H1 of the focusing ring 110 can press against the limiting portion 1211a of the rotation buffer structure 1211 and then push against the projection lens mounting ring 120, so that the projection lens mounting ring 120 rotates synchronously with the focusing ring 110, and the projection lens L locked with the projection lens mounting ring 120 is also driven to adjust the focal length synchronously.

Incidentally, the locking member SE of this embodiment may include stepped screws, so the shaft portion SE1 may have a wide section (not shown) and a narrow section (not shown) connected to each other. The narrow section has an external thread for screwing to the projection lens L, and the wide section may be connected between the narrow section and the head portion SE2. The clamping area CA is, for example, clamping the wide section. When the projection lens mounting ring 120 is detached from the projection lens L, the locking member SE on the projection lens L can be loosened from the head portion SE2 to move the narrow section into the clamping area CA, so that the shaft portion SE1 can pass through the channel area TA more easily and therefore the projection lens mounting ring 120 is easier to be detached.

Compared with the prior art, in the focusing module 100 of this embodiment, the focusing ring 110 has the limiting hole H1, the projection lens mounting ring 120 has the rotation buffer structure 1211 corresponding to the limiting hole H1, and the limiting portion 1211a of the rotation buffer structure 1211 can be located in the limiting hole H1. Further, the thickness T of the limiting portion 1211a gradually decreases from the center C toward the opposite first side S1 and second side S2, and the first annular wall 112 can press against the first side S1 and the second side S2 of the limiting portion 1211a. Therefore, when the rotational force on the focusing ring 110 is too large, the first annular wall 112 will gradually move toward the center C from the second side S2 (or the first side S1) and then press against the center C to disengage the center C from the limiting hole H1. In this case, because the center C is pressed against by the first annular wall 112, the second annular wall 121 will move relative to the first annular wall 112 when the focusing ring 110 is continuously rotated. In this way, the focusing ring 110 can rotate relative to the projection lens mounting ring 120 instead of driving the projection lens mounting ring 120 to rotate together, thereby preventing the focusing module 100 and the projection lens L from being damaged due to excessive rotation of the focusing ring 110.

Figure 10:
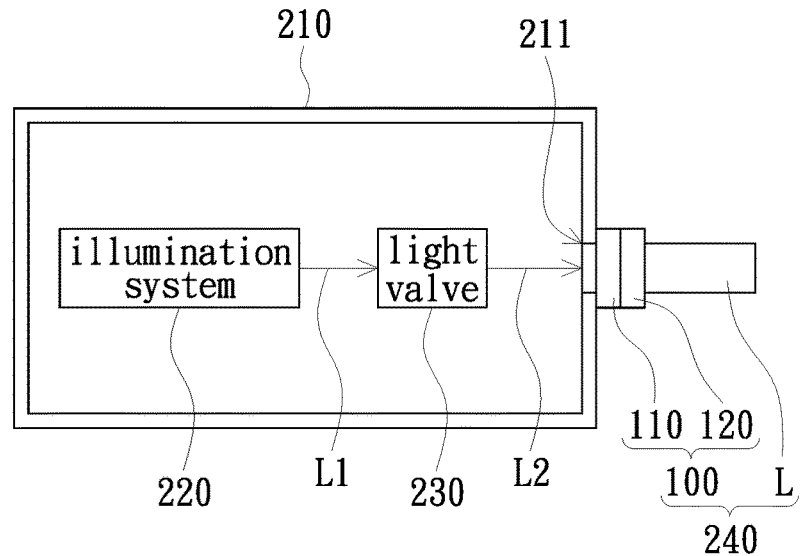
FIG. 10 is a schematic view of a projection apparatus according to an embodiment of the invention.

FIG. 10 is a schematic view of a projection apparatus according to an embodiment of the invention. Referring to FIG. 10, the projection apparatus 200 includes a housing 210, an illumination system 220, a light valve 230 and a projection lens assembly 240. The illumination system 220 is disposed in the housing 210 and is adapted to provide an illumination beam L1. The light valve 230 is disposed in the housing 210 and located on a transmission path of the illumination beam L1 to convert the illumination beam L1 into an image beam L2. The housing 210 has an opening 211. The projection lens assembly 240 is disposed in the opening 211 and located on a transmission path of the image beam L2 to project the image beam L2 out of the projection apparatus 200. The projection lens assembly 240 includes the aforementioned projection lens L and the aforementioned focusing module 100, and the focusing module 100 is connected to the projection lens L. For example, in this embodiment, the focusing ring 110 is disposed beside the opening 211, and the projection lens mounting ring 120 may be connected between the focusing ring 110 and the projection lens L. The user can rotate the focusing ring 110 which synchronously drives the projection lens L to perform the focusing operation. Because the features of the focusing module 100 have been described in detail above, no redundant detail is to be given herein.

The illumination system 220 is configured to generate the illumination beam L1. In this embodiment, the illumination system 220 may include an excitation light source and a wavelength conversion element. The excitation light source includes, for example, a light emitting diode (LED) or a laser diode (LD), wherein the number of the light emitting diode or the laser diode can be one or plural. For example, the light emitting diodes (or laser diodes) may be arranged in a matrix when the number of light emitting diodes (or laser diodes) is plural. The excitation light source is configured to generate an excitation beam. A wavelength conversion material is disposed on the wavelength conversion element to convert the excitation beam into the illumination beam L1. Specifically, the wavelength of the excitation beam incident on the wavelength conversion material is converted by the wavelength conversion material, while the wavelength of the excitation beam not incident on the wavelength conversion material is not converted, wherein the illumination beam L1 includes the unconverted excitation beam and the converted excitation beam. In another embodiment, the illumination system 220 may include a metal halide lamp or an ultra-high pressure mercury lamp, and the invention is not limited thereto.

The light valve 230 in this embodiment includes, for example, a digital micromirror device (DMD), but the invention is not limited thereto. For example, in one embodiment, the light valve 230 may include a liquid crystal on silicon (LCoS) display or a liquid crystal display (LCD). In addition, this embodiment does not limit the number of light valves. For example, in the embodiment in which the light valve 230 includes the aforementioned liquid crystal display panel, the projection apparatus 200 may adopt the structure of a single-chip liquid crystal display or a three-chip liquid crystal display, but the invention is not limited thereto.

In this embodiment, the projection lens L includes, for example, one or more optical lenses and is accommodated in a lens barrel (not labeled), and the dioptric powers of the optical lenses may be the same or different from each other. For example, the optical lens may include various non-planar lenses such as bi-concave lenses, bi-convex lenses, concave-convex lenses, convex-concave lenses, plano-convex lenses, and plano-concave lenses, or any combination of the above non-planar lenses. On the other hand, the projection lens L may include a flat optical lens. The invention does not limit the specific structure of the projection lens L.

Compared with the prior art, the projection apparatus 200 of this embodiment has the advantage of good durability due to adopting the focusing module 100.

In summary, in the focusing module of the invention, the focusing ring has the limiting hole, the projection lens mounting ring has the rotation buffer structure corresponding to the limiting hole, and the limiting portion of the rotation buffer structure can be located in the limiting hole. Further, the thickness of the limiting portion gradually decreases from the center toward the opposite first side and second side, and the first annular wall can press against the first side and the second side. Therefore, when the rotational force on the focusing ring is too large, the first annular wall will gradually move toward the center from the second side (or the first side) and then press against the center to disengage the center from the limiting hole. In this case, because the center of the limiting portion is pressed against by the first annular wall, the second annular wall will move along the first annular wall when the focusing ring is continuously rotated. In this way, the focusing ring can rotate relative to the projection lens mounting ring instead of driving the projection lens mounting ring to rotate together, thereby preventing the structures of the focusing module and the projection lens from being damaged due to excessive rotation of the focusing ring. On the other hand, the projection apparatus of the invention has the advantage of good durability due to adopting the aforementioned focusing module.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A focusing module, adapted for a projection lens with an optical axis, and the focusing module comprising a focusing ring and a projection lens mounting ring, wherein
  the focusing ring has a first ring body and a first annular wall, the first ring body has a first opening and a second opening opposite to each other, the first annular wall is connected to the first ring body and surrounds the first opening, the first annular wall has a limiting hole, an inner annular surface and an outer annular surface, the inner annular surface is opposite to the outer annular surface, and the limiting hole penetrates the inner annular surface and the outer annular surface of the first annular wall along a direction perpendicular to the optical axis; and the projection lens mounting ring has a second annular wall adapted to be fixed to the projection lens along the optical axis, the second annular wall is disposed on an inner side of the first annular wall and is adapted to rotate relative to the first annular wall along a circumferential direction of the first annular wall, the second annular wall has a through hole and a rotation buffer structure, the rotation buffer structure is located in the through hole and has a limiting portion and a cantilever portion, the cantilever portion is connected between the limiting portion and a hole edge of the through hole, the limiting portion has a center surrounded by the hole edge, the center protrudes toward a direction facing the first annular wall of the focusing ring and has a first side and a second side opposite to each other in the circumferential direction, and a thickness of the limiting portion gradually decreases from the center toward the first side and the second side in a radial direction of the second annular wall;

wherein the center of the limiting portion is located in the limiting hole and the first annular wall is pressed against the first side and the second side when the limiting portion of the rotation buffer structure contacts against the limiting hole of the focusing ring.

2. The focusing module according to claim 1, wherein the first side and the second side of the center of the limiting portion each have a guiding slope.

3. The focusing module according to claim 2, wherein the guiding slopes are connected to each other and surround the center of the limiting portion.

4. The focusing module according to claim 1, wherein the first annular wall of the focusing ring surrounds an outer side of the second annular wall with the optical axis as a center, and the inner annular surface of the first annular wall faces the second annular wall, wherein when the focusing ring rotates around the optical axis, the limiting hole of the focusing ring presses against the limiting portion of the rotation buffer structure, so that the projection lens mounting ring and the focusing ring rotate synchronously.

5. The focusing module according to claim 4, wherein when the cantilever portion of the rotation buffer structure of the projection lens mounting ring is elastically deformed in a direction away from the inner annular surface and the center of the limiting portion leaves the limiting hole, the center of the limiting portion is pressed against the inner annular surface of the first annular wall of the focusing ring, so that the focusing ring rotates relative to the projection lens mounting ring.

6. The focusing module according to claim 5, wherein the inner annular surface of the first annular wall of the focusing ring has a plurality of stage difference structures; the stage difference structures are spaced apart from each other and arranged along the circumferential direction; the stage difference structures correspond to the center of the limiting portion.

7. The focusing module according to claim 1, wherein a number of the limiting holes is plural, a number of the through holes corresponds to the number of the limiting holes, and the limiting holes and the through holes are arranged equidistantly in the circumferential direction.

8. The focusing module according to claim 1, wherein the second annular wall of the projection lens mounting ring is adapted to be locked to the projection lens along the direction perpendicular to the optical axis via a plurality of locking members, each of the locking members has a shaft portion and a head portion, the second annular wall further has an inner side surface, an outer side surface, an annular top edge and a plurality of installation openings, the annular top edge is connected between the inner side surface and the outer side surface, each of the installation openings penetrates the inner side surface and the outer side surface along the direction perpendicular to the optical axis and extends to the annular top edge along a direction parallel to the optical axis, each of the installation openings is provided with two hook portions opposite to each other, a clamping area and a channel area are formed between the two hook portions, the channel area is communicated with the clamping area along the direction parallel to the optical axis and extends to the annular top edge, wherein when the projection lens mounting ring is assembled to the projection lens along the optical axis, the two hook portions in each of the installation openings are adapted to deform so that the shaft portion passes through the channel area and is fixed in the clamping area.

9. The focusing module according to claim 1, wherein the projection lens mounting ring further has a third opening and a fourth opening, the third opening and the fourth opening are respectively located on opposite sides of the second annular wall and the second annular wall surrounds the third opening and the fourth opening, the fourth opening is adapted for the projection lens to be installed, the second annular wall has a third side close to the third opening and a fourth side close to the fourth opening, an outer diameter of the second annular wall on the fourth side is smaller than an inner diameter of the first opening, and an outer diameter of the second annular wall on the third side is bigger than the inner diameter of the first opening.

10. The focusing module according to claim 1, wherein two opposite ends of the cantilever portion of the rotation buffer structure are respectively connected to the limiting portion and the hole edge of the through hole, and the cantilever portion and the limiting portion are arranged along a direction parallel to the optical axis.

11. A projection apparatus, comprising a housing, an illumination system, a light valve, and a projection lens assembly, the illumination system being disposed in the housing and adapted to provide an illumination beam, the light valve being disposed in the housing and located on a transmission path of the illumination beam from the illumination system to convert the illumination beam into an image beam, the housing having an opening, the projection lens assembly being disposed in the opening and located on a transmission path of the image beam from the light valve to project the image beam out of the projection apparatus, the projection lens assembly comprising a projection lens and a focusing module, the projection lens having an optical axis, the focusing module being connected to the projection lens, wherein the focusing module comprises a focusing ring and a projection lens mounting ring, wherein the focusing ring has a first ring body and a first annular wall, the first ring body has a first opening and a second opening opposite to each other, the first annular wall is connected to the first ring body and surrounds the first opening, the first annular wall has a limiting hole, an inner annular surface and an outer annular surface, the inner annular surface is opposite to the outer annular surface, and the limiting hole penetrates the inner annular surface and the outer annular surface of the first annular wall along a direction perpendicular to the optical axis; and the projection lens mounting ring has a second annular wall adapted to be fixed to the projection lens along the optical axis, the second annular wall is disposed on an inner side of the first annular wall and is adapted to rotate relative to the first annular wall along a circumferential direction of the first annular wall, the second annular wall has a through hole and a rotation buffer structure, the rotation buffer structure is located in the through hole and has a limiting portion and a cantilever portion, the cantilever portion is connected between the limiting portion and a hole edge of the through hole, the limiting portion has a center surrounded by the hole edge, the center protrudes toward a direction facing the first annular wall of the focusing ring and has a first side and a second side opposite to each other in the circumferential direction, and a thickness of the limiting portion gradually decreases from the center toward the first side and the second side in a radial direction of the second annular wall;

wherein the center of the limiting portion is located in the limiting hole and the first annular wall is pressed against the first side and the second side when the limiting portion of the rotation buffer structure contacts against the limiting hole of the focusing ring.

12. The projection apparatus according to claim 11, wherein the first side and the second side of the center of the limiting portion each have a guiding slope.

13. The projection apparatus according to claim 12, wherein the guiding slopes are connected to each other and surround the center of the limiting portion.

14. The projection apparatus according to claim 11, wherein the first annular wall of the focusing ring surrounds an outer side of the second annular wall with the optical axis as a center, and the inner annular surface of the first annular wall faces the second annular wall, wherein when the focusing ring rotates around the optical axis, the limiting hole of the focusing ring presses against the limiting portion of the rotation buffer structure, so that the projection lens mounting ring and the focusing ring rotate synchronously.

15. The projection apparatus according to claim 14, wherein when the cantilever portion of the rotation buffer structure of the projection lens mounting ring is elastically deformed in a direction away from the inner annular surface and the center of the limiting portion leaves the limiting hole, the center of the limiting portion is pressed against the inner annular surface of the first annular wall of the focusing ring, so that the focusing ring rotates relative to the projection lens mounting ring.

16. The projection apparatus according to claim 15, wherein the inner annular surface has a plurality of stage difference structures; the stage difference structures are spaced apart from each other and arranged along the circumferential direction; the stage difference structures correspond to the center of the limiting portion.

17. The projection apparatus according to claim 11, wherein a number of the limiting holes is plural, a number of the through holes corresponds to the number of the limiting holes, and the limiting holes and the through holes are arranged equidistantly in the circumferential direction.

18. The projection apparatus according to claim 11, further comprising a plurality of locking members, wherein the second annular wall of the projection lens mounting ring is locked to the projection lens along the direction perpendicular to the optical axis via the locking members, each of the locking members has a shaft portion and a head portion, the second annular wall further has an inner side surface, an outer side surface, an annular top edge and a plurality of installation openings, the annular top edge is connected between the inner side surface and the outer side surface, each of the installation openings penetrates the inner side surface and the outer side surface along the direction perpendicular to the optical axis and extends to the annular top edge along a direction parallel to the optical axis, each of the installation openings is provided with two hook portions opposite to each other, a clamping area and a channel area are formed between the two hook portions, the channel area is communicated with the clamping area along the direction parallel to the optical axis and extends to the annular top edge, wherein when the projection lens mounting ring is assembled to the projection lens along the optical axis, the two hook portions in each of the installation openings are adapted to deform so that the shaft portion passes through the channel area and is fixed in the clamping area.

19. The projection apparatus according to claim 11, wherein the projection lens mounting ring further has a third opening and a fourth opening, the third opening and the fourth opening are respectively located on opposite sides of the second annular wall and the second annular wall surrounds the third opening and the fourth opening, the fourth opening is adapted for the projection lens to be installed, the second annular wall has a third side close to the third opening and a fourth side close to the fourth opening, an outer diameter of the second annular wall on the fourth side is smaller than an inner diameter of the first opening, and an outer diameter of the second annular wall on the third side is bigger than the inner diameter of the first opening.

20. The projection apparatus according to claim 11, wherein two opposite ends of the cantilever portion of the rotation buffer structure are respectively connected to the limiting portion and the hole edge of the through hole, and the cantilever portion and the limiting portion are arranged along a direction parallel to the optical axis.

* * * * *